E. BIVERT.
MARINE MOTOR.
APPLICATION FILED NOV. 21, 1916.

1,261,346.

Patented Apr. 2, 1918.
6 SHEETS—SHEET 3.

Witnesses:

Inventor:
Eugene Bivert,

E. BIVERT.
MARINE MOTOR.
APPLICATION FILED NOV. 21, 1916.

1,261,346.

Patented Apr. 2, 1918.
6 SHEETS—SHEET 4.

Witnesses:

Inventor:
Eugene Bivert,
By Poole & Warren
Attys.

UNITED STATES PATENT OFFICE.

EUGENE BIVERT, OF CHICAGO, ILLINOIS.

MARINE MOTOR.

1,261,346.

Specification of Letters Patent.

Patented Apr. 2, 1918.

Application filed November 21, 1916. Serial No. 132,565.

*To all whom it may concern:*

Be it known that I, EUGENE BIVERT, a citizen of the United States, residing at Chicago, in the county of Cook and State of Illinois, have invented new and useful Improvements in Marine Motors, of which the following is a specification.

This invention relates to improvements in marine motors of the outboard or portable type, designed to be attached to the stern of a small craft or boat, and embracing, in a single and comparatively small unit, a complete motive and propelling mechanism.

A motor of the character referred to is fully described and illustrated in a United States Letters Patent granted to me on May 2, 1916 and bearing the Number 1,181,634, wherein the general features of construction and arrangement are disclosed.

The present invention relates to certain improved and novel features applicable to all devices of the character described and particularly to a motor such as herein illustrated and described, the purpose thereof being to provide a more workmanlike and substantial construction, whereby the device is rendered capable of withstanding a greater degree of hard usage and of accomplishing the work demanded in a more dependable and efficient manner. Other improved features relate to those parts of a motor which control the operation and performance of the device, as well as the starting thereof, these features being incorporated with a view of producing a motor that can be controlled more easily and with the same degree of convenience that is experienced with boats or vessels provided with a permanently installed and more elaborate motive power and propelling mechanism.

The several features embodying the invention will hereinafter be described in detail and with reference to the accompanying drawings, wherein the several features are fully illustrated.

Figures 3, 4, 5:
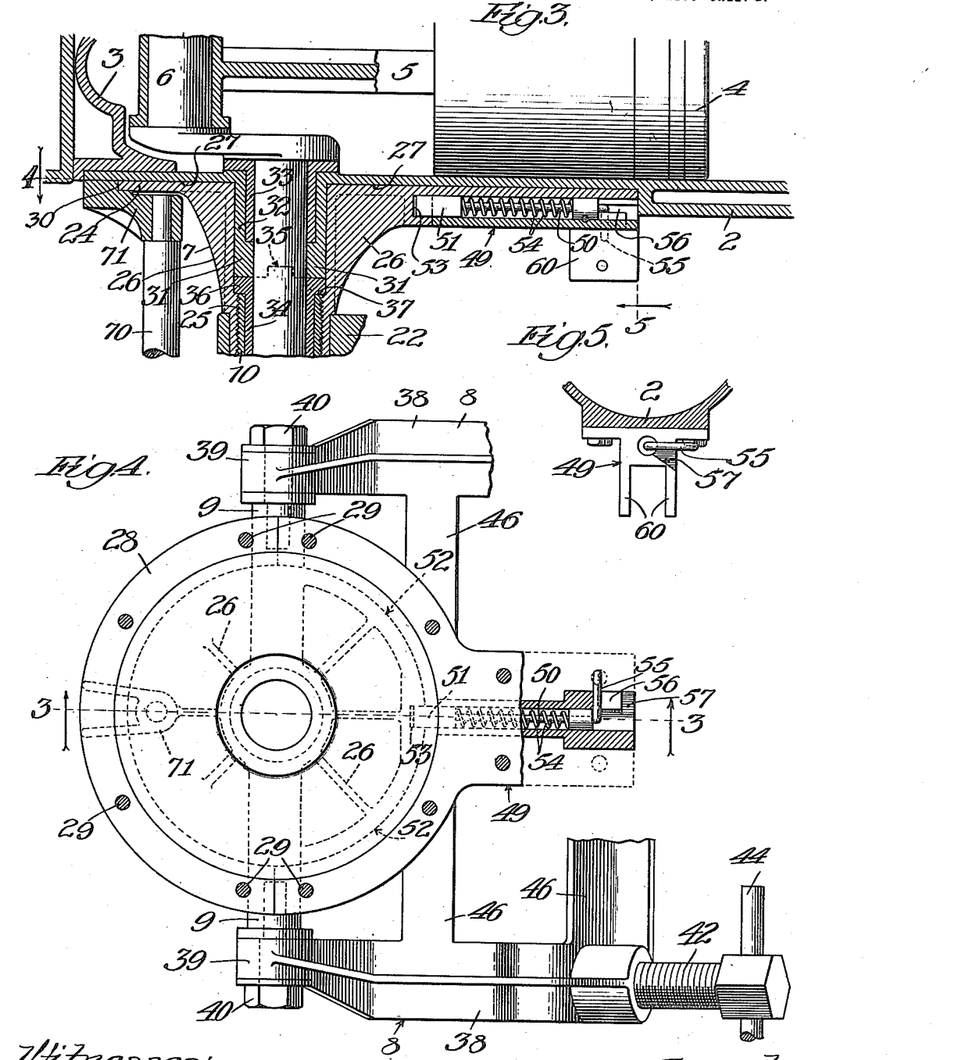
Fig. 3 is a view in vertical section, taken on line 3—3 of Figs. 2 and 4, showing the pivotal bearing plate supporting the motor and adjacent parts.
Fig. 4 is a view in cross-section, taken on line 4—4 of Fig. 3, showing the pivotal bearing plate in plan view.
Fig. 5 is a detail view in section, taken on line 5—5 of Fig. 3, showing the locking device for the motor.
Figures 21, 22:
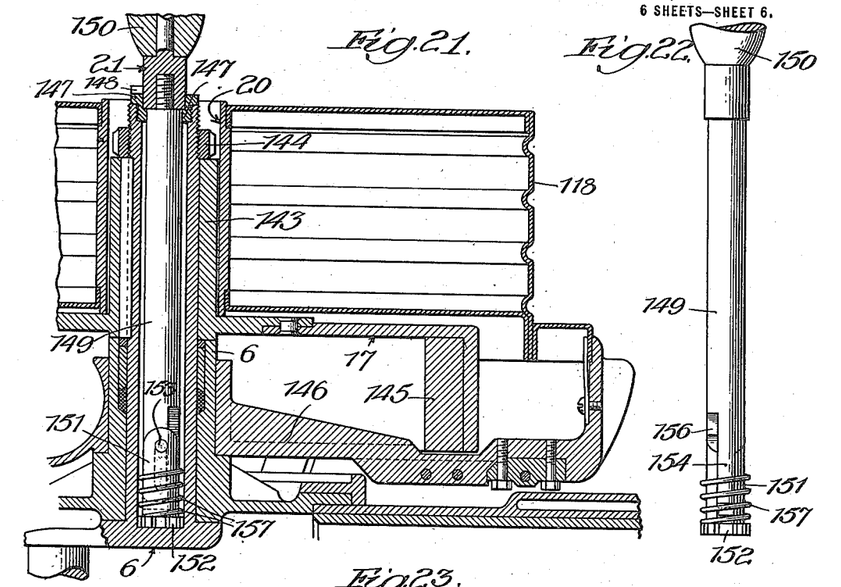
Fig. 21 is a cross-sectional view of the upper part of crank shaft, fly-wheel, and fuel tank, showing the starting crank in non-operative position.
Fig. 22 is a view in elevation of the starting crank removed.

Referring first to the arrangement of the principal parts constituting the device embodying the features of the invention, the same comprises the following members or parts, to wit, an internal combustion engine or motor 1, preferably of the single-cylinder, two-cycle type, said engine consisting of parts common to such engines, namely, a cylinder 2, a crank case 3, a piston 4, connecting rod 5, and a crank 6, said piston, connecting rod, and crank being located within the cylinder and crank case in the usual manner and as illustrated in Fig. 3. The internal combustion engine or motor 1 is arranged in horizontal position and rotatively supported upon a bearing member 7, engaging the under surface of the crank case and arranged in concentric relation to the axis of rotation of the motor. The bearing member 7 is, in turn, supported by a bracket 8, said bearing member being provided with trunnions 9, integral with said bearing member and projecting laterally from opposite sides thereof and having pivotal connection with the bracket 8. The bracket is, in turn, adapted to be removably connected to the stern or rear portion of a boat or craft. Extending vertically downward from the motor, in axial alinement with the crank shaft and extending through a tubular sleeve of the bearing member 7, is a tubular casing or post 10, supporting or carrying at its lower end a transmission casing 11, the same comprising an elongated, hollow casing extending at right angles to the post 10 and parallel to the motor 1. Within the transmission casing 11 is mounted a propeller shaft 12, which projects rearwardly from said casing and has mounted thereon a propeller 13, said propeller shaft having driving connection with a drive shaft within said post and connected to the crank shaft 6. Within said casing are also contained the members of a clutch mechanism and clutch-shifting members, which will hereinafter be described in detail. Integral with the transmission casing and extending vertically downward therefrom is an integral fin 14, constituting the rudder for steering the boat. In addition to the rudder fin 14, there are also provided horizontally and laterally projecting fins 15 at either side of the transmission casing and integral therewith, said fins acting as stabilizing members, and, further, as guard fins for protecting the propeller from contact with objects floating in the water, and from weeds or other obstructions which would otherwise interfere with the free rotation of said propeller. In addition to the parts already mentioned in connection with the transmission casing, there is also mounted thereon a water-circulating pump 16, the same being located immediately adjacent to the lower extremity of the post 10 and on the opposite side thereof from the propeller 13. The water-circulating pump, as will hereinafter be more fully described, is adapted to supply water to the water jacket of the motor cylinder for cooling the same. Above the motor 1 is located the fly-wheel 17, fixed to the crank shaft, said fly-wheel being arranged to rotate in a horizontal plane and about a vertical axis coinciding with the axis of the crank shaft. The fly-wheel is surmounted by the fuel tank 18, which is supported upon a bracket or spider 19 having a plurality of radially and upwardly extending arms connected to the lower edges of the tank 18. The fuel tank is further provided with a centrally located opening 20 (Fig. 21), through which extends the upper extremity of the crank shaft, there being provided at the end of the crank shaft a starting handle 21, hereinafter more fully described. As a means for rotating or swinging the motor 1, together with the post 10 and transmission casing 11, a steering lever 22 is located immediately below the cylinder and crank case of the motor 1, said steering lever being loosely mounted upon the post 10 immediately below the bearing member 7 and fixed to the motor, so that by moving the lever in a horizontal plane the motor 1, together with the post 10 and transmission casing 11, will likewise be moved or rotated relatively to the bearing member 7 and bracket 8, thereby effecting the steering of the boat in the desired direction through the medium of the rudder fin 14. The steering lever is provided with a handle 23, adapted to be grasped by the operator, said handle also constituting an independently operated control lever for a reversing mechanism associated with the steering lever and operating certain members connected with the clutch and gear shifting mechanism within the transmission casing 11. The reversing mechanism and control therefor will be described hereinafter in detail.

The bearing member 7, before indicated as supporting the motor and other parts of the device, comprises a comparatively large circular disk or bearing plate 24 having an upwardly facing bearing surface, and a sleeve 25 extending downwardly below said plate and in axial alinement with the axis of rotation of the crank shaft 6. The bearing plate 24 and sleeve are preferably made integral, there being provided additional supporting members for the bearing plate, in the form of longitudinally and radially extending ribs or flanges 26 located in spaced relation about the outer surface of the sleeve 25 and beneath the bearing plate 24. Upon the lower surface of the crank case 3 is provided a circular bearing surface 27 in bearing engagement with the upwardly facing surface of the bearing plate and constituting therewith the main bearing by which the motor and parts rigidly connected thereto are supported, in a manner to permit rotation about the axis of the post 10 and crank shaft and relative to the bearing member 7 and bracket 8. Surrounding the outer edge of the bearing surface 27 of the crank case is provided a circular flange 28, rigidly connected to the crank case by means of screws 29. The flange 28 surrounds the periphery of the bearing plate 24, and is provided upon its inner edge with a recess or marginal groove 30, engaging the outer edge or periphery of the bearing plate 24 and serving to connect the bearing member 7 to the crank case and to retain the bearing surfaces in concentric relation.

As a further means for supporting the motor upon the bearing member 7, there is provided at the central portion of the bearing surface 27 of the crank case an integral sleeve 31, projecting downwardly into the sleeve 25 of the bearing member 7, said sleeve 31 supporting a bushing 32 in concentric relation therewith, and acting as a bearing for the lower end portion 33 of the crank shaft 6.

As shown in Fig. 3, the bushing 32 is retained within a recess formed in the sleeve 31 and terminating short of the lower end thereof, said sleeve in turn terminating short of the lower extremity of the sleeve 25 of the bearing member. The lower end of the sleeve 31 bears against the upper extremity of a tubular sleeve 34, which, as will hereinafter be pointed out, extends throughout the length of the post 10 and has rigid connection with the transmission casing 11. The abutting ends of said sleeve 31 and tubular sleeve 34 are connected together by means of a tongue and mortise joint as at 35, said tubular sleeve being further connected to or suspended from the bearing member 7, by the provision of a flange 36 at the upper end thereof, said flange engaging a shoulder formed at the lower end of the annular recess within said sleeve 25, as at 37 (Fig. 3).

Figures 1, 2:
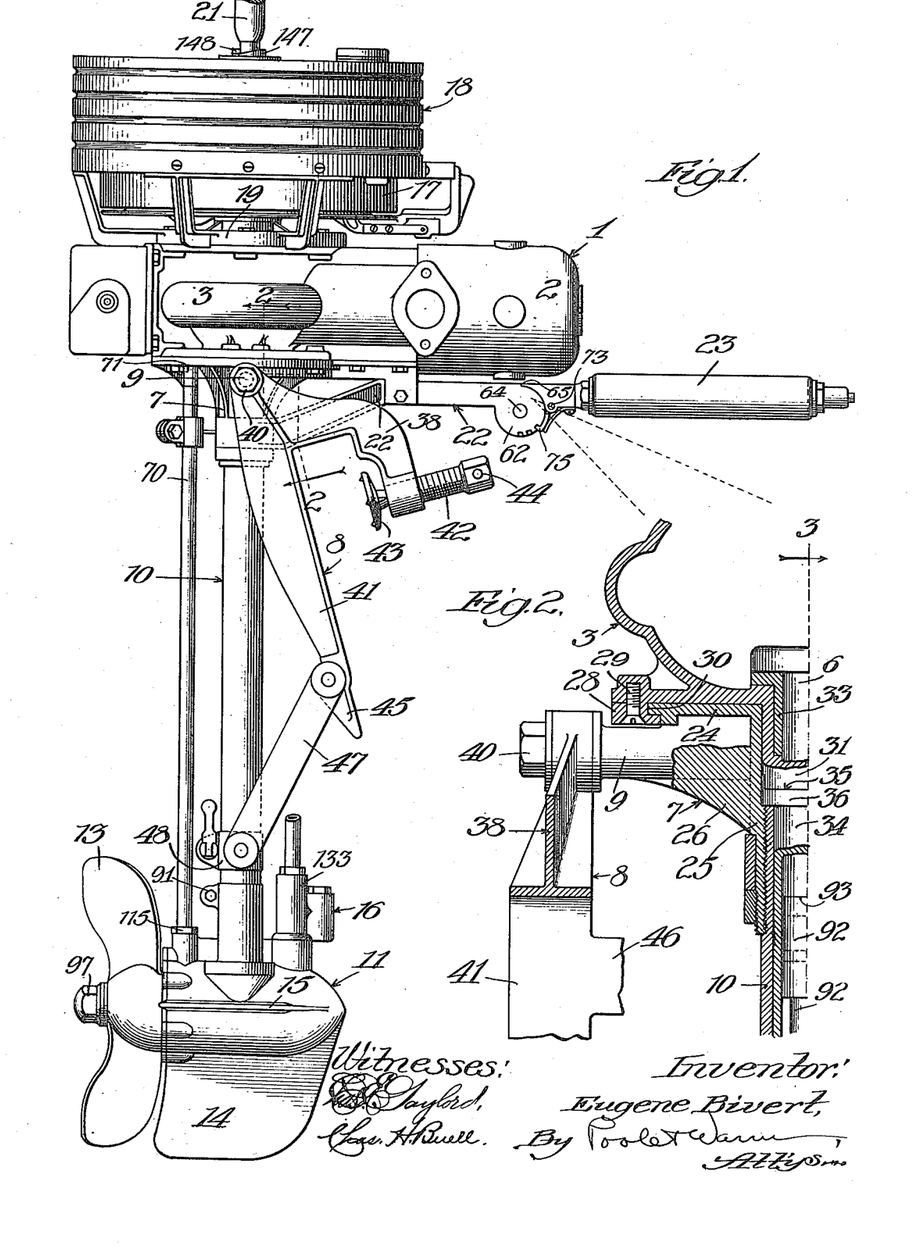
Figure 1 is a view in side elevation of a complete motor embodying the improved features of construction.
Fig. 2 is an enlarged fragmentary view in horizontal section, taken on line 2—2 of Fig. 1, and showing the manner of mounting the motor upon its supporting bracket.

Extending radially and from opposite sides of the bearing member 7, immediately below the bearing plate 24, are the trunnions 9, 9, formed integral with the sleeve 25 of said bearing member and projecting a short distance beyond the periphery of the bearing plate 24, as shown in Fig. 2. Pivotally connected to the outer ends of the trunnions 9, 9 are the parallel arms 38, 38 of the bracket 8, said arms being parallel and extending forwardly in the direction of the motor cylinder and spaced apart a distance somewhat greater than the diameter of the bearing plate 24. The bracket arms 38 are preferably provided with cylindric bearing members 39, which are engaged by bearing screws 40, 40 mounted at the ends of said trunnions.

Referring to Figs. 1 and 2, the arms 38, 38 extend forwardly and in a substantially horizontal direction for a short distance, and are provided at the ends thereof with downwardly extending end portions, said end portions being spaced from and in parallel relation to arms 41 extending in a downward direction immediately below the trunnions 9, 9 and at right angles to the horizontal portions of the arms 38, 38. The arms 41, 41, together with the arms 38, 38, form the downwardly opening recesses adapted to engage the stern portion of a boat or craft, preferably of the type having a flat end or stern, slightly inclined. As a means for rigidly securing the bracket to the boat, there are provided clamp screws 42. 42, mounted at the lower end of each arm 38, 38, having clamping members 43, 43 at the inner ends and handles 44, 44 at their outer ends. Furthermore, the arms 41, 41 extend some distance below the clamp screws, being preferably curved inwardly toward each other and joined together at their lower ends in the form of a forked tongue 45, adapted to removably engage a screw or other fastening device secured to the boat. To provide a more rigid bracket, the arms 38, 38 and 41, 41 are connected together by cross bars 46 (Fig. 4) integral with said arms. As a means for adjusting the annular relation of the bracket 8 to the motor, and for providing a brace for the lower portion of said bracket, there are provided links 47, 47, pivotally connected on opposite sides of the tongue 45 at the lower ends of the arms 41, 41, said links having pivotal connection with a sliding collar 48 surrounding the post 10, there being provided suitable clamping means for fixing said collar in the desired position of adjustment along said post.

In order to hold those parts of the device which normally are free to rotate or swing relative to the bearing member 7 in a fixed position, as is desirable under certain conditions, as for instance when the motor is being started, there is provided a construction which permits the cylinder to be locked to the bearing member, this locking mechanism being preferably constructed as follows. Extending radially from the flange 28, surrounding the bearing plate 24, is a block 49 (Figs. 3, 4, and 5), preferably integral with said flange and extending in a forward direction immediately below the cylinder. This block is provided with a longitudinal channel, within which is mounted an endwise movable rod or plunger 50, having at its end adjacent the bearing plate 24 a locking head 51. In the plane of the head, and formed on the periphery of the plate 24, is a semi-circular bearing surface 52 extending throughout the arc between the trunnions 9, 9, there being provided, at a point upon said bearing surface 52 arranged at 90° to the axis of said trunnions 9, 9, a depression or notch 53, adapted to be engaged by the locking head 51 of the plunger. Surrounding the plunger rod 50 is a coil spring 54, acting to move the rod endwise in a direction to effect the engagement of the locking head with the notch 53. To move said plunger rod in the opposite direction, out of locking engagement, and to retain the same in unlocked position, there is provided at the outer end of the plunger rod a bayonet lock, comprising a handle 55, preferably formed by bending the end of the rod at an angle of 90° thereto, said handle engaging a slot 56, provided at its outer end with a downwardly extending locking notch 57 (Figs. 3, 4, and 5). Thus, to effect the locking of the motor to the fixed or non-rotative bearing member 7, it is only necessary to rotate the plunger rod axially by means of the handle 55, so that it disengages the locking notch 57, whereupon the rod is free to be moved endwise by the spring 54, to effect the locking of the head 51 with the notch 53 of the bearing plate 24, thereby locking the motor from rotation upon the bearing member 7. After the motor has been started, or when it is desired to swing the motor, for the purpose of steering the boat, the rod is moved forward, and the handle 55 swung downwardly into the notch 57.

Figures 6, 7, 8, 9, 10, 11:
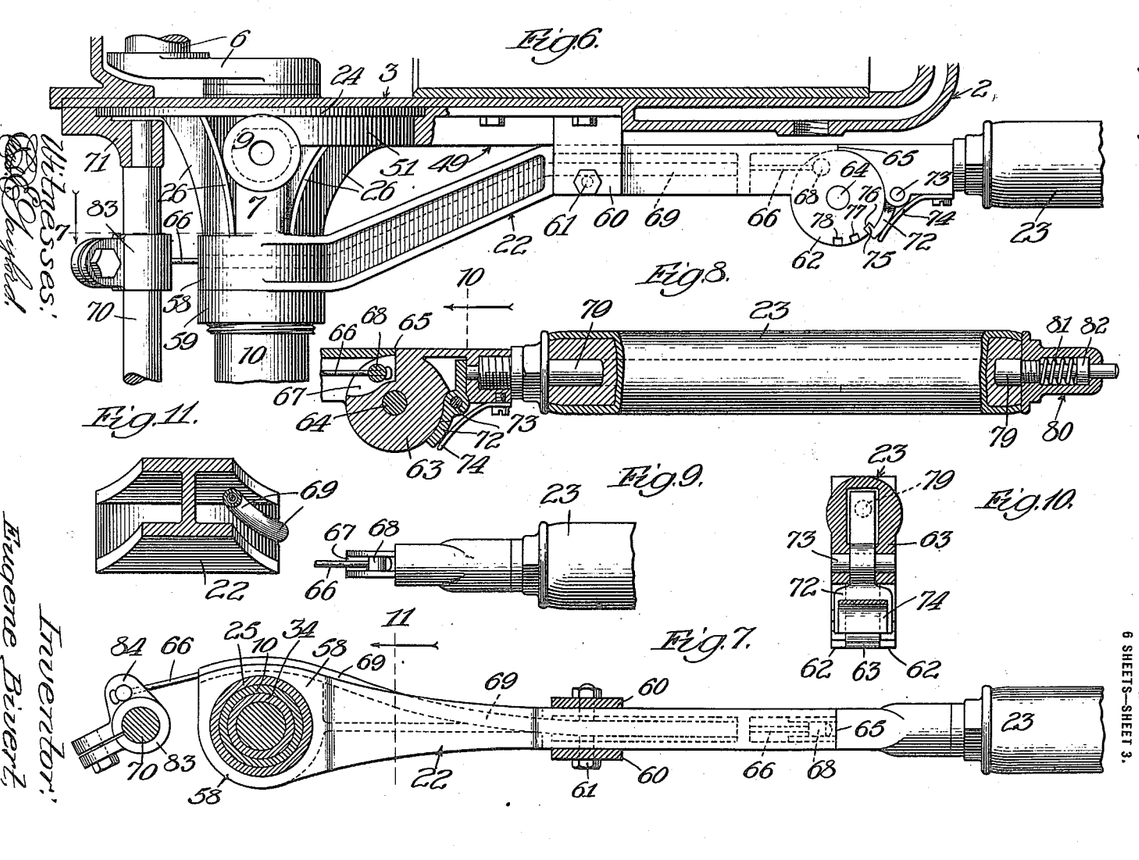
Fig. 6 is an enlarged view in elevation of the steering and reversing lever and mechanism.
Fig. 7 is a top plan view of the steering and reversing lever.
Fig. 8 is a sectional view of the steering handle and reversing mechanism control, with part of the handle in elevation.
Fig. 9 is an enlarged plan view of the inner end of the steering handle and part of the reversing mechanism control.
Fig. 10 is a detail view in section, taken on line 10—10 of Fig. 8.
Fig. 11 is an enlarged view in cross-section, taken on line 11—11 of Fig. 7.

Referring now to the steering and reversing lever, the same has heretofore been described as performing both the functions of rotating the motor for the purpose of steering and of controlling the clutch or reversing mechanism, and as consisting in general of a lever 22 provided with a handle 23, the latter being grasped by the operator and capable of being moved to the right or left with the lever 22 in a horizontal plane, after the manner of an ordinary tiller, and also moved or rotated in a vertical plane relative to the lever 22, to effect the control of the clutch mechanism. The lever 22 is located immediately below the cylinder 2 and crank case 3, and is rotatively mounted upon the bearing member 7 by the provision of an integral collar 58, which surrounds the lower end of the sleeve 25 of the bearing member 7, there being provided a locking ring 59 (Fig. 6) having screw-threaded engagement with said sleeve 25 and acting to provide a bearing for the lever collar 58. The lever 22 extends forwardly in parallel relation to the cylinder and in an upwardly inclined direction throughout the inner end portion of its length, the outer end portion extending horizontally and in close proximity to the under surface of the cylinder. The lever is rigidly connected to the cylinder by means of depending ears 60, 60, preferably integral with the block 49 (Figs. 5 and 6), said ears extending downwardly on either side of the lever, the latter being further connected thereto by means of a bolt or pin 61 extending transversely through said ears and lever. The lever is preferably of the so-called I-beam form throughout its length, as shown in Fig. 11, having a vertical web and horizontal webs at the ends of the vertical web.

Connected to the outer end of the lever 22 is the heretofore mentioned handle 23, said lever and handle being pivotally joined together in the following manner. Formed integral with the lever and at the outer end thereof are two disks 62, 62 (Figs. 6 and 10), spaced apart and embracing between them a disk 63 (Fig. 8) integral with the handle 23. A pin 64 extends through the disks 62 and 63, and forms the pivotal connection whereby said lever and handle are connected together. The handle 23 is adapted to be swung downwardly from a horizontal position, as shown in Figs. 6 and 8, to one of several positions of inclination to the horizontal, its movement upwardly being limited to a horizontal position by co-acting shoulders or surfaces on the lever and handle, as at 65. The movement of the handle downwardly effects the actuation of certain members controlling the clutch and gear shifting mechanism, as will now be pointed out. Connected to the disk 63 of the handle is one end of a flexible rod or wire 66, the same being secured thereto above the pivot pin 64 by the provision of a notch 67 and a transverse pin 68 within said notch, to which the end of the wire is secured (Figs. 8 and 9). The wire extends longitudinally of the lever 22, being preferably inclosed within a tube 69 extending between the horizontal flanges thereof, as shown in Figs. 7 and 11, said tube passing to one side of the collar 58 and terminating a short distance beyond. Extending parallel with the post and to the rear thereof is a vertical shaft 70 rotatively mounted at its ends in bearings, the upper bearing having the form of a bracket 71 rigidly connected to the under side of the crank case 3. The lower end of the shaft is connected to certain members coöperating with the clutch shifting mechanism located within the gear case 11, which will be hereinafter described together with the bearing at the lower end of said shaft. For the present it is sufficient to say that by rotating the shaft 70 through a predetermined angle the clutch mechanism will be moved into position whereby the propeller will rotate in a direction to propel the boat forward, or in the reverse direction to propel the boat backward, or moved into neutral position, wherein the propeller is disconnected from the motor. The rotation of the shaft 70 is controlled or governed by the following devices employed in connection with the handle 23. Mounted upon the lower end of said handle is a dog or latch 72, pivoted intermediate its ends upon a transverse pin 73, the lower portion being arranged to extend downwardly in close proximity to the periphery of the disks 62 and 63, being held in such position by a leaf spring 74 mounted upon the handle adjacent thereto. At the lower end of the dog is provided an inwardly projecting lug 75, adapted to engage a series of notches 76, 77, and 78, arranged in spaced relation about the periphery of the disks 62. The upper portion of the dog extends upwardly into a cavity formed in the adjacent end of the handle 23, and is adapted to contact with a push-rod 79, extending throughout the length of the handle and projecting a short distance beyond the free end thereof, there bing provided a nut 80 at the end of the handle having a cavity, wherein is mounted a small coil spring 81 surrounding the rod and engaging a collar 82 mounted on the rod. The spring acts to resist the inward endwise movement of the rod and to hold the same normally in its outwardly extended position.

From the preceding description it will be seen that the handle performs two functions, namely, the steering of the boat by the swinging of the motor and post from left to right, in a manner hereinbefore set forth, and, secondly, the control of the clutch mechanism by moving the handle vertically, the latter operation being accomplished by pressing the outer end of the push-rod 79 inwardly, thus releasing the latch member 72, which permits the handle to be swung either upwardly or downwardly, depending on the position of the handle. When the handle is horizontal, as shown in the drawings, the latch 72 engages the notch 76, which position corresponds to the forward driving position of the clutch mechanism. The adjacent notch 77, when engaged by the dog 72 in the downward movement of the handle, corresponds to the neutral position of the clutch mechanism, the downward movement of the handle to the neutral position serving to rotate the disk 63, which in turn draws the wire 66 endwise, transmitting a rotative movement to the shaft 70 through the medium of a clamp member 83, secured to the shaft 70 and provided with a lug 84, to which the outer end of the wire 66 is connected. The further downward movement of the handle 23, after releasing the dog by pressing the push-rod inwardly, moves the cluth mechanism into reversing position, such position being determined by the engagement of the dog 72 with the notch 78.

Figure 12:
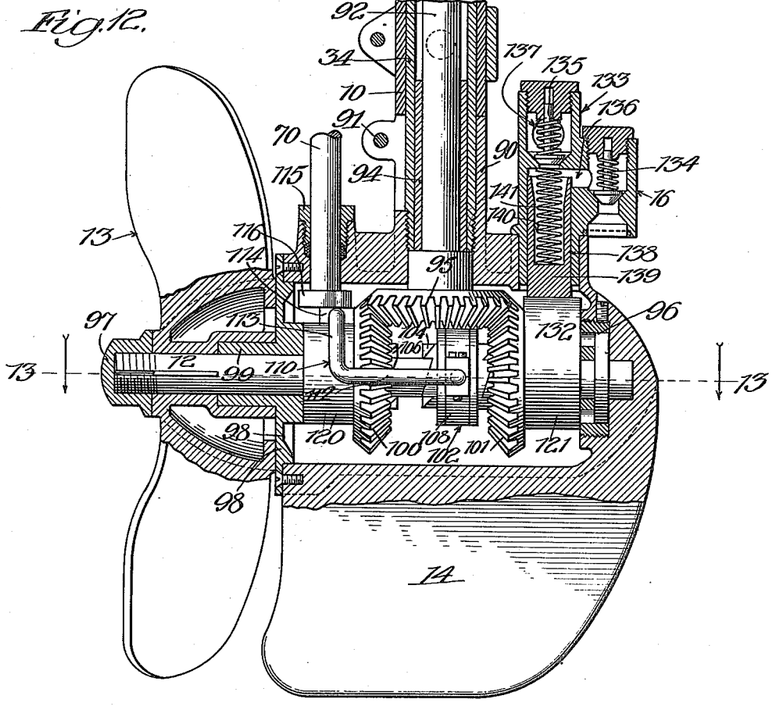
Fig. 12 is an enlarged view in vertical section, taken through the transmission casing, showing the transmission mechanism in elevation.
Figure 14:
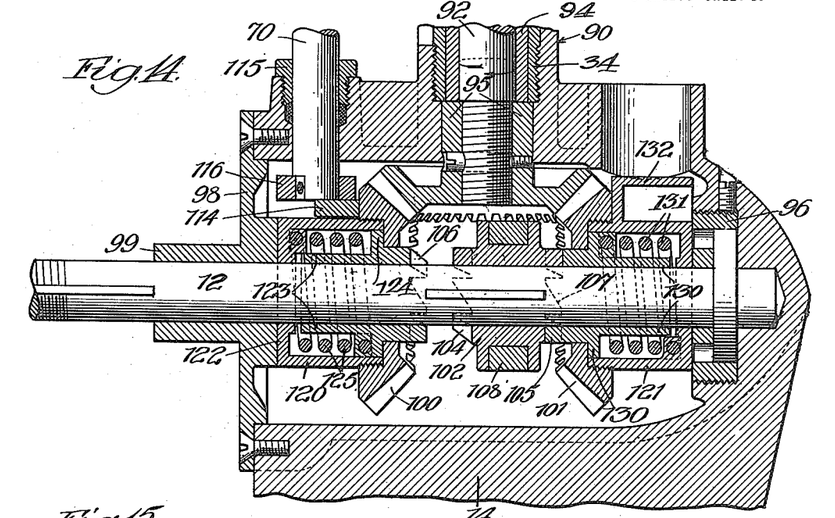
Fig. 14 shows a portion of Fig. 12, further enlarged, with the transmission gears and clutch in section.

By this arrangement it is possible to steer the boat and to control the clutch and reversing mechanisms by a single lever, which is moved in one direction for the purpose of steering and in another direction for controlling the clutch mechanism. The transmission casing, as before suggested, is mounted at the lower end of the post 10, said post, as shown in Figs. 3 and 12, having the form of a tubular sleeve rigidly connected to or suspended from the sleeve 25 of the bearing member 7 by a screw-threaded engagement, said outer sleeve or post being thus held in non-rotative position relative to the motor and the transmission casing. Within the post 10 is mounted the inner sleeve 34, before described as connected at its upper end to the crank case sleeve 31, which turns with the crank case and relative to the surrounding stationary post 10, the latter forming a bearing therefor. The inner rotative sleeve extends at its lower end beyond the lower end of the post 10, and engages a split collar 90 integral with the transmission casing, said collar surrounding the lower end of the sleeve 34 and clamped thereto by the provision of the well known arrangement of lugs on either side of the longitudinal slot in said collar and a bolt 91 extending through said lugs. The upper margin of the split collar 90 has abutting relation with the lower margin of the outer sleeve or post 10. At the lower end of the sleeve 34 are provided screw threads, which engage a screw-threaded aperture in the upper wall of the transmission casing and at the base of the split collar 90. Mounted within the inner tubular sleeve 34 is the driving shaft 92, said shaft being connected at its upper end to the lower end portion of the crank shaft 6 by a suitable connection, such as a tongue and mortise joint as at 93 (Fig. 2). The drive shaft projects into the transmission casing, there being provided, adjacent its lower end and within the lower end of the sleeve 34, a bearing or bushing 94. Secured to the lower end of the drive shaft 92, by means of screw threads as shown in Fig. 14, is a bevel gear member 95, arranged to rotate in a horizontal plane and about an axis coinciding with the axis of the driving shaft 92. The propeller shaft 12, as before stated, extends axially of the transmission casing and at right angles to said driving shaft. one end of said propeller shaft, namely, the forward end, being mounted in a thrust bearing 96, the same being retained within a cavity formed at the forward end of said transmission casing. The opposite end of the propeller shaft projects from the transmission casing, and has keyed thereon the propeller 13, as before set forth, the end of said propeller shaft beyond the propeller being surmounted by a nut 97. The end of the transmission casing adjacent to the propeller terminates in a vertical plane forming an aperture substantialy of the same diameter as the cavity within the transmission casing, said opening being closed by a flat, circular end plate 98, secured to the transmission casing by means of screws and having at its central portion a bearing sleeve 99 integral therewith, which forms a bearing for the outer end of the propeller shaft. The central portion or hub of the propeller is preferably formed to provide an enlarged shell, shaped to conform to the generally bullet shape of the transmission casing, said hub tapering outwardly to a point toward the end of the propeller shaft, in the same manner that the forward end of the transmission casing is tapered and rounded, in order to offer the least resistance to the passage of the transmission casing through the water.

Mounted on the propeller shaft are bevel gear members 100 and 101, said gear members—which may be termed the driven gear members—being spaced apart and arranged to mesh with the driving gear member 95 at points diametrically opposite each other. By this arrangement, if one of the driven gear members were fixed to the propeller shaft and the other permitted to revolve freely thereon, the propeller shaft would be rotated in one direction; whereas, if the other gear member were fixed to the propeller shaft, the propeller would be rotated in the opposite direction. The mechanism whereby the driven gear members 100 and 101 may be alternately fixed to the propeller shaft consists of a clutch member and clutch-shifting members, which will now be described. Referring to Figs. 12 and 14, there is provided upon the propeller shaft 12 and intermediate the driven gear members 100 and 101 a shiftable clutch member 102, said clutch member being capable of sliding movement longitudinally of the propeller shaft, but retained from rotative movement thereon by means of a key 103 (Fig. 14), fixed to the propeller shaft and engaging a slot in the clutch member 102, and projecting outwardly therefrom and axially of the propeller shaft in opposite directions, are formed series of clutch teeth 104 and 105, said teeth being adapted to engage corresponding series of clutch teeth 106 and 107, respectively, which for the present may be considered as part of and integral with their respective driven gear members 100 and 101.

Figure 13:
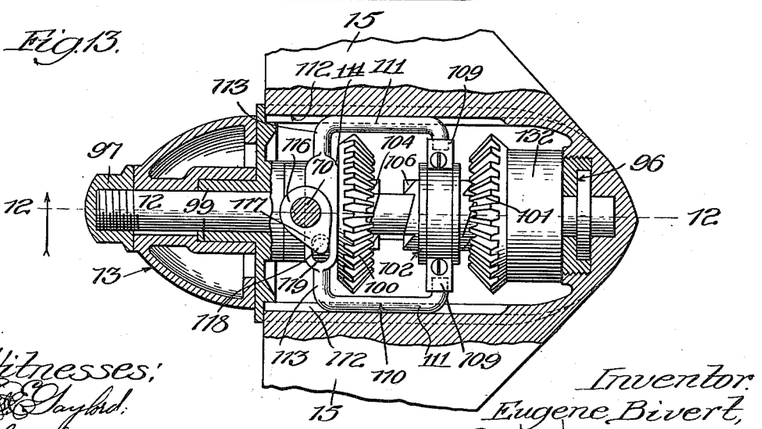
Fig. 13 is a transverse sectional view, taken on line 13—13 of Fig. 12.

The means for transmitting endwise shifting movement to the clutch member 102 comprise parts as follows: Surrounding the clutch member 102 is a clutch ring 108, said ring being mounted in an annular groove formed on the outer surface of said clutch member and loosely retained therein to permit the clutch member 102 to rotate with the propeller shaft and independently of said clutch ring 108. Extending from opposite sides of the clutch ring and in a lateral direction are provided integral lugs 109 (Fig. 13), in which are mounted the ends of a U-shaped, clutch-shifting yoke 110, said yoke comprising horizontal arms 111, which rest within grooves 112 formed on opposite sides and within the wall of the transmission casing and vertically extending arms 113, which are joined together immediately above and to the rear of the driven gear member 100 in the form of a transversely extending block 114. Operatively connected to the block 114 is the reversing shaft 70, heretofore described as being connected with the clutch mechanism control handle in a manner to be rotated axially. The reversing shaft extends through the upper wall of the transmission casing, there being preferably provided, at the point of entrance, a stuffing box 115 of the usual type. The lower end of the shaft 70 terminates immediately above the block 114 of the clutch shifting yoke, and is at that point provided with a collar 116 rigidly fixed thereto, said collar being provided with a laterally projecting arm or crank 117, said crank being provided with a downwardly extending pin 118, which engages an elongated slot 119 extending longitudinally of and adjacent to one end of the block 114 of the clutch shifting yoke 110. It is apparent from this description that the axial rotation of the shaft 70 through the medium of the control handle 23 imparts to the clutch shifting yoke an endwise movement through the medium of the crank and pin connection between the block 114 of the clutch shifting yoke and the so-called crank collar 116. The endwise movement of the clutch shifting yoke imparts a like movement to the clutch member 102 in either direction, thus effecting the engagement of the oppositely disposed series of clutch teeth 104 and 105 with either series of the clutch teeth 106 or 107; thus, when the clutch member is shifted to the right into the position shown in the drawings (Figs. 12, 13, and 14), that is, with the clutch teeth 105 engaging the teeth 107 of the gear member 101, the propeller shaft will be rotated in a direction to propel the boat forward, it being assumed that the drive shaft is rotated in a clockwise or right to left direction by the motor. So also, when the clutch member is shifted to the left (in the drawings) and the clutch teeth 104 engage the teeth 106 of the gear member 100, the direction of rotation of the propeller shaft will be reversed and the boat propelled backwardly. Similarly, if the clutch member is moved to a position midway between the driven gear members 100 and 101 and out of engagement with both series of clutch teeth 106 and 107, the propeller shaft will be disconnected from the driving shaft, and the same will cease to rotate, the clutch member being in so-called neutral position, wherein the motor will continue to run without driving the boat in either direction.

Figures 15, 16:
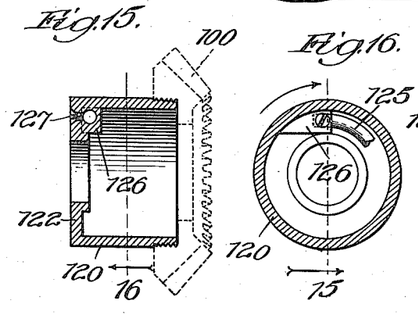
Fig. 15 is a detail view in section of a clutch spring housing removed.
Fig. 16 is a view showing the clutch spring housing in cross-section and taken on line 16—16 of Fig. 15.
Figures 17, 18:
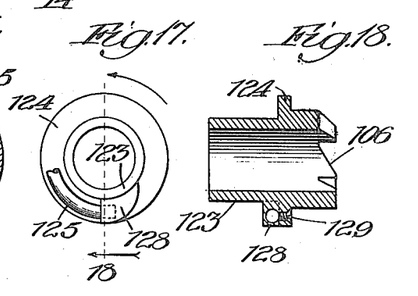
Fig. 17 is a detail view in end elevation of one of the clutch members removed.
Fig. 18 is a view in vertical section of the clutch member shown in Fig. 17, and taken on line 18—18 of Fig. 17.
Figure 19:
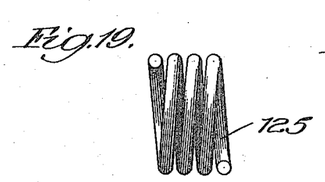
Fig. 19 is a view of a clutch spring removed.
Figure 20:
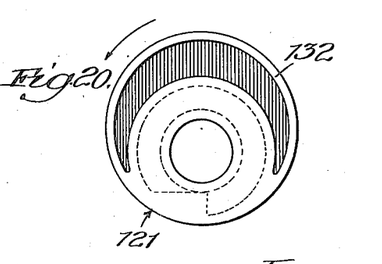
Fig. 20 is a view in end elevation of one of the clutch spring housings, having the eccentric pump cam.

Bearing in mind that the propeller is driven in opposite directions and entirely disconnected from the driving shaft by the shifting of the clutch member 102, in the manner above described, the particular construction employed for connecting the driven gear members 100 and 101 to the propeller shaft will now be described in detail. The gear members 100 and 101 have rigid connection with housings or sleeves 120 and 121, respectively, said housings and associated parts being substantially identical in construction, hence the housing 120, associated with the driven gear member 100, will be described in detail, it being understood that the corresponding parts are to be found in connection with the bevel gear 101. The housing 120 (Figs. 14, 15, and 16) consists of a hollow cylindric sleeve having a partially closed end 122, having abutting engagement with the cover plate 98, said closed end being provided with a central aperture forming the bearing which supports the housing upon the propeller shaft 12, said housing being free to rotate thereon. Upon the end of the housing opposite said closed end is rigidly fixed the gear member 100, said housing forming in reality the hub of the gear member. Mounted on the propeller shaft, and substantially surrounded by the housing 120 is a clutch sleeve 123 (Figs. 14, 17, and 18), said sleeve being provided with an end flange, which projects beyond the gear member 100 and is provided about its outer edge with the clutch teeth 106, hereinbefore described as associated with the gear member 100. Intermediate the ends of the sleeve 123 is provided an annular shoulder 124, which bears outwardly against the face of the gear member 100. Between the outer surface of the clutch sleeve 123 and the inner annular surface of the housing 120 is formed an annular space or cavity, within which is mounted a comparatively heavy coil spring 125, said coil spring being secured at one end to the outer or closed end of the housing, as shown in Figs. 15 and 16, preferably by providing a boss 126 upon the inner surface of the housing, said boss having an aperture adapted to receive the end of the spring, there being further provided a screw 127 extending through the end wall of the housing and engaging the end of the spring. Similarly, the opposite end of the spring 125 is rigidly connected to the clutch sleeve 123, said clutch sleeve being provided with a boss 128 adjacent to the shoulder 124, within which is formed an aperture adapted to receive the end of the spring, there being also provided a screw 129 adapted to firmly connect the spring to said sleeve. It is to be observed that the spring 125 forms the connection between the gear member 100 and the clutch sleeve 123, inasmuch as these members are otherwise free to rotate upon the propeller shaft and relative to each other. Furthermore, since the gear member 100 is mounted on the housing 120, the power transmitted thereto from the driving gear 95 rotates the housing 120, which rotative movement is transmitted to the clutch sleeve 123 through the medium of the spring, and from the clutch sleeve to the clutch member 102, which is assumed to have engagement with the clutch sleeve, and from the clutch member to the propeller shaft. The manner in which the spring 125 transmits power from the housing to the clutch sleeve is to be understood from the following. The ends of the spring 125 being fixed to the housing 120 and the clutch sleeve 123, in the rotation of the gear members in, say, a clockwise direction, the clutch sleeve 123 being held stationary by reason of its connection with the propeller shaft through the clutch member 102, the spring 125 will be expanded circumferentially until the several coils of said spring come in contact with the inner annular surface of the housing 120, to the extent that they frictionally grip said surface and thus act to connect the housing directly to the clutch sleeve. To this end the spring 125, in fact, constitutes a clutch member, and the coacting surfaces of the spring coils and the housing constitute frictional clutch surfaces. By this arrangement, therefore, the transmission of power from the driving gear member 95 is of a yielding nature, inasmuch as the power is transmitted from the housing to the clutch sleeve gradually as the spring is expanded, thereby avoiding sudden shocks which would accompany the transmission of power through positively connected members, and furthermore permits the clutch teeth of the sleeve 123 to remain stationary until they have fully engaged the clutch teeth of the clutch-shifting member 102. As before mentioned, the same arrangement of parts is provided in connection with the gear member 101, namely, the housing or hub 121, upon which said gear member 101 is mounted; a clutch sleeve 130, similar to the sleeve 123, upon which are provided the clutch teeth 107; a spring 131 connected at its opposite ends to the housing 121 and the clutch sleeve 130, although in the reverse relation inasmuch as the direction of rotation of the gear member 101 is opposed to that of the gear member 100 and its associated housing 120.

It is manifest that the arrangement of the springs 125 and 131, connected to and interposed between the hollow hubs or spring housings 120 and 121, and the associated clutch sleeves, provide supplementary clutches, which are actuated automatically by the relative rotation of the parts to yieldingly connect the gear members 100 and 101 to the propeller shaft 12 through the medium of the shiftable clutch member 102. As has already been suggested, this arrangement produces a clutch or reversing mechanism capable of being operated with a greater degree of smoothness and sureness, inasmuch as the clutch cannot be thrown in to instantly and positively connect the driven gear members to the propeller shaft, and again, the gradual transmission of power gives the clutch teeth ample time to become fully engaged before the members are positively connected tgether.

Associated with the driven gear member 101 is a cam 132, adapted to operate the water-circulating pump. This cam consists of a circular flange, preferably cast integral with the housing or hub 121 of the gear member 101 and arranged eccentrically to the axis of rotation of said gear member. The manner in which the cam performs its function will be shown in connection with the following description of the pump.

The water-circulating pump (Fig. 12) comprises a pump casing 133 mounted within an aperture in the transmission casing, within which is mounted an inlet valve 134, of the well known spring-actuated suction type, said inlet valve communicating with an outlet valve 135 by means of a passage 136. The outlet valve is of the same construction as the inlet valve, although so located as to be opened by the pressure of the water in the passage 136, there being provided above said outlet valve a chamber having an outlet opening 137 communicating with a suitable hose or pipe connection whereby the water is carried to the water jacket of the cylinder. Immediately below the outlet valve is a cylindric passage 138 communicating at its upper end with the passage 136 and having mounted therein an endwise movable plunger 139, said plunger being provided with an axially arranged cavity 140, within which is mounted a spring 141, which bears against the upper end of the passage 138 adjacent to the valve 135. The lower end of the plunger projects into the transmission casing and bears upon the outer surface of the cam 132, said plunger being held in contact with the cam surface by means of the spring 141. As the driven gear member 101 is rotated, the plunger is actuated with an endwise reciprocating movement by means of the cam 132, a quantity of water being drawn in through the inlet valve as the plunger travels downwardly, and on the succeeding upward stroke is forced through the outlet valve and thence through a hose or pipe into the water jacket of the cylinder.

Referring now to the method employed for starting the motor, consisting in general of the well known starting crank, serving to rotate the crank shaft by hand until the initial ignition takes place and the motor continues to operate under its own power. The particular construction employed and embodying one of the features of the invention will be understood from the following. As hereinbefore described, the upper end of the crank shaft 6 extends vertically upward and through the cavity 20 (Fig. 21) extending from the top to the bottom of the fuel tank 18. Keyed to the crank shaft is a sleeve 143, secured thereto by means of a locking collar 144, said sleeve in turn carrying the fly-wheel 17, which embraces parts of a magneto, namely, the magnets 145 and a lever 146 rotatably mounted on said sleeve 143 and adapted to be swung about the axis of said sleeve for the purpose of advancing and retarding the spark, that is, the adjustment of the instant of ignition with relation to the position of the piston during its compression stroke. Inasmuch as the particular ignition device forms no part of this invention, the same need not be further described.

Figures 23, 24, 25, 26:
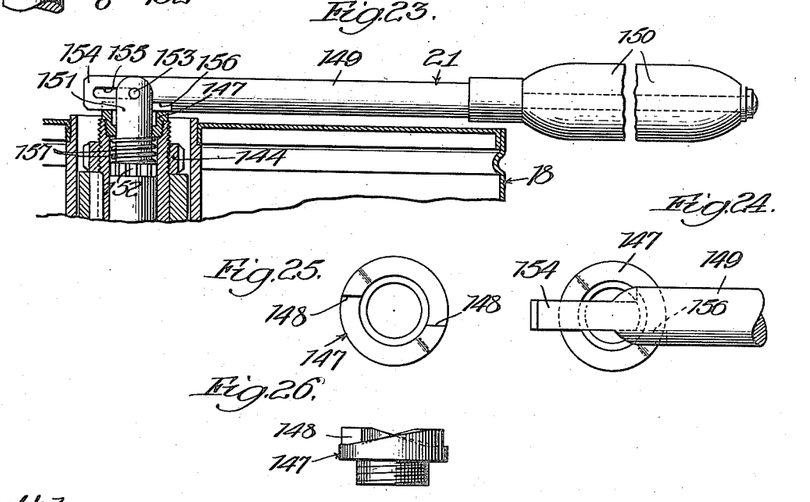
Fig. 23 is a view of the upper end of the crank shaft in section, with starting crank in position for operation.
Fig. 24 is an enlarged detail plan view of the inner end of the starting crank in operative position.
Fig. 25 is an enlarged plan view of the ratchet collar mounted at the end of the crank shaft.
Fig. 26 is a view in elevation of the ratchet collar shown in Fig. 25.

The upper end of the crank shaft 6 terminates adjacent to the upper surface of the fuel tank, and is tubular throughout its length, so as to form a vertical cavity cylindric in shape and comparatively large in diameter. Inserted within a socket at the upper extremity of the crank shaft is provided a ratchet collar 147 (Figs. 21, 25, and 26), having screw-threaded engagement with the crank shaft, said ratchet collar having a central aperture extending therethrough and two ratchet teeth or shoulders 148 arranged on opposite sides of the upwardly facing surface thereof, said ratchet teeth being of the usual form having vertical and lateral facing surfaces or shoulders and inclined surfaces extending from the upper edge of each shoulder to the base of the other shoulder. Within the central cavity of the crank shaft is mounted the shank 149 of the starting crank 21, said shank being of substantially the same length as the upper end of the crank shaft and provided at its upper end with the handle 150 having screw-threaded engagement therewith and projecting upwardly from the end of the crank shaft when said starting crank is in nonoperative position. Connected to the lower end of the shank 149 is a hinge member 151, comprising a cylindric bifurcated stem and an enlarged cylindric base portion 152. The hinge member 151 is pivotally connected to the lower end of the shaft 149 by means of a pin 153 extending transversely through the bifurcated stem of the hinge member 151 and an elongated slot 155 formed in the adjacent end 154 of the shaft 149, said end being flattened throughout a short distance beyond either end of said slot. The end portion 154 engages the bifurcated stem of the hinge member 151 and, further, constitutes the portion of the shaft which engages the ratchet shoulder, said shaft being provided with a notch 156 adjacent to the inner end of the slot 155, adapted to engage one of said shoulders 148, as will hereinafter be more fully described. Surrounding the hinge member 151 is a small coil spring 157, the purpose of which will be apparent in connection with the description of the manipulation of the starting crank.

If it is desired to start the engine, the same being non-operative, the crank is drawn upwardly in a vertical direction until the end of the hinge member projects from the ratchet collar 147 and the spring 157 comes in contact with the under surface of said collar. In this position the shank 149 can be swung downward about the pivot pin 153 until said handle assumes a horizontal position, and then, upon forcing the handle longitudinally until the pin 153 engages the inner end of the elongated slot 155, the flattened end of the shank and the locking notch 156 are brought into position to engage the ratchet shoulders 148. The handle can now be turned in a clockwise direction until the motor has started, whereupon the crank is released from the ratchet collar, which is made possible by the presence of the spring 157, which exerts sufficient tension to hold the crank in contact with the ratchet shoulders but permits sufficient upward movement of the hinge member 151 to permit the starting crank to be released from the ratchet collar. After the motor has been started, the starting crank can be moved into vertical position and again dropped downward into the cavity within the crank shaft, while it will continue to rotate therewith but otherwise be out of the way and in such a position that it cannot strike any portion of the body or become entangled in the garments worn by the operator.

Among the advantages secured from the improved features herein described, and of particular importance in devices to which this invention relates, is the form of bearing employed for supporting the motor and other parts of the device—it is advisable that the motor be capable of being swung easily and through a maximum arc, in order that the boat can be steered with the least effort and in such manner as to readily respond to the position of the rudder. The use of a bearing plate of comparatively large diameter is productive of the desired results, in that it provides a large bearing surface, sufficient to support the motor with ample rigidity and stability, thereby overcoming the effects of the vibration of the motor, which is obviously minimized by extending the bearing surfaces in a direction at right angles to the axis of rotation of the crank shaft. Furthermore, the provision of a comparatively large bearing plate, in addition to a bearing sleeve such as is ordinarily employed, increases the area of the bearing surfaces, thus decreasing the degree of wear throughout the main supporting bearing, to the end that the liability of an undesirable degree of looseness and play between the parts is eliminated, and the life, as well as the capacity of the device to withstand long and hard usage, is materially increased. Another important feature is the method employed in mounting or connecting the bearing member to the bracket, namely, by the provision of the comparatively long arms or trunnions, which permits the motor and supporting bearing to be suspended from the bracket from points spaced apart a considerable distance from the axis of rotation of the motor. This again increases the stability of the device, and furthermore permits greater freedom in steering the boat, inasmuch as the motor can be swung through an arc of substantially 180°, thus affording the maximum steering range.

Another feature to be pointed out in connection with the main supporting bearing is the method of suspending the sleeve, which carries the transmission casing, from the main bearing, rather than rigidly connecting it to the crank case, thereby eliminating to a large degree the transmission of the vibration of the motor to the transmission casing and propeller. The result of this is, manifestly, to increase the smoothness of operation and elimination of jar and wear in the parts of the transmission mechanism.

The advantages of the particular form of combined steering and control lever have heretofore been suggested, namely, the convenience of controlling the operation by a single member and with one hand. In addition, the use of a flexible rod and mode of determining the desired position of the clutch mechanism provides a simple and light construction, all of which is desirable in devices of the character described.

The particular results accomplished by the construction employed in connection with the clutch mechanism and motor starting crank have already been set forth, both of these features being instrumental in producing an improved mode of operating the device itself, as well as increasing the ease and safety with which the necessary exertions of the operator may be accomplished.

The several features herein described and illustrated may be variously modified in detail of construction, without departing from the spirit of the invention, and for that reason it is desired not to limit the scope thereof, except in so far as specifically pointed out in the appended claims.

I claim as my invention:

1. The combination of a motor, a bearing tube provided with a bearing plate of relatively large diameter at one end thereof, having bearing engagement with said motor, and a supporting bracket connected to said bearing tube adjacent said bearing plate.

2. The combination of a motor and a bearing member for relatively supporting said motor, comprising a plate of relatively large diameter, having bearing engagement with said motor, and a supporting bracket pivotally connected to said bearing member adjacent to said plate.

3. The combination of a motor, a bearing member for rotatively supporting said motor, comprising a circular plate in concentric relation with the crank shaft of said motor, and having bearing engagement with the crank case of said motor.

4. The combination of a motor, a bearing member rotatively supporting said motor, comprising a sleeve having bearing engagement with a tubular extension of the crank case, and a circular bearing plate of relatively large diameter concentric with said sleeve and having bearing engagement with the crank case of said motor.

5. The combination of a motor and a bearing member for rotatively supporting said motor, comprising a bearing plate having bearing engagement with the crank case of said motor, and provided with a central aperture of relatively small diameter, in concentric relation with the crank case of said motor, and a supporting bracket pivotally connected to said bearing member adjacent to said plate.

6. The combination of a motor, a bearing member rotatively supporting said motor, comprising a bearing plate having bearing engagement with the crank case of said motor, a bearing sleeve integral with said bearing plate and arranged concentrically therewith and with the crank shaft of said motor, and a supporting bracket pivotally connected to said bearing sleeve adjacent the periphery of said plate.

7. The combination of a motor, a bearing member rotatively supporting said motor, comprising a bearing plate of relatively large diameter, having bearing engagement with the crank case of said motor, a bearing sleeve integral with said bearing plate and arranged concentrically therewith and with the crank shaft of said motor, said bearing member being provided with oppositely disposed trunnions extending radially from said sleeve and adjacent the periphery of said plate, and a bracket pivotally mounted on said trunnions.

8. The combination of a motor and means for rotatively supporting said motor, comprising a bearing plate having bearing engagement with the crank case of said motor, a bearing sleeve integral with said bearing plate and arranged concentrically therewith and with the crank shaft of said motor, said sleeve being provided with radially extending arms on opposite sides thereof projecting beyond the periphery of said bearing plate, and a supporting bracket having pivotal connection with said arms.

9. The combination with a motor, of means for rotatively supporting said motor, comprising a bearing sleeve in axial alinement with the axis of rotation of the crank shaft of said motor, said sleeve being provided with a bearing plate of relatively large diameter, in bearing engagement with the crank case of said motor, said crank case being provided with a tubular extension having bearing in said sleeve, and a tube suspended from said bearing sleeve and non-rotatively connected with said tubular extension of the crank case.

10. The combination of a motor, a bearing sleeve in axial alinement with the crank shaft of said motor and provided with a bearing plate of relatively large diameter at the end of said sleeve and having rotative bearing engagement with the crank case of said motor, a tube suspended within said bearing sleeve and non-rotatively connected to said motor, a transmission casing rigidly mounted in the opposite end of said tube, and a drive shaft mounted within said tube.

11. The combination of a motor, a bearing sleeve in axial alinement with the crank shaft of said motor and provided with a bearing plate of relatively large diameter, having bearing engagement with said motor, a tube within said bearing sleeve and rotatively suspended from said bearing sleeve and operatively connected to said motor, a driving shaft rotatively mounted in said tube, a transmission casing fixed to the free end of said tube, and a driven shaft in said transmission casing having driving connection with said driving shaft.

12. The combination of a motor, a bearing sleeve in axial alinement with the crank shaft of said motor and having rotative bearing engagement with the crank case of said motor, said crank case having a tubular extension in bearing engagement with said sleeve, a tube provided with an annular flange, having bearing engagement with a shoulder formed within said bearing sleeve, said tube having non-rotative connection with said tubular extension of said crank case.

13. The combination of a motor, a vertical bearing sleeve in axial alinement with the crank shaft of said motor, and provided with a bearing plate of relatively large diameter, having bearing engagement with the under surface of the crank case of said motor, a tube rotatively suspended within said bearing sleeve and connected to said motor, and a transmission casing fixed to the free end of said tube.

14. The combination of a motor, a bearing member rotatively supporting said motor, comprising a bearing plate having bearing engagement with the crank case of said motor, and means for locking said motor from rotation relative to said bearing member, comprising an endwise movable rod mounted on said motor and operable to engage a notch formed in the periphery of said bearing plate.

15. The combination of a motor, a bearing member rotatively supporting said motor, comprising a bearing plate having bearing engagement with the crank case of said motor, and means for locking said motor from rotative relation to said bearing member, comprising a spring-actuated plunger adapted to engage a notch in the periphery of said bearing plate, and means for normally retaining said plunger out of locking engagement with said notch.

16. The combination of a motor, a bearing member supporting said motor, a casing mounted on said bearing member and provided with a rudder, reversing mechanism mounted within said transmission casing, a steering lever operatively connected with said rudder and provided with an oscillatory handle, and a flexible member connecting said handle and reversing mechanism.

17. The combination of a motor, a bearing member rotatively supporting said motor, a casing rotative with said motor and provided with a rudder, reversing mechanism mounted within said transmission casing, a steering lever connected to said motor and provided with a handle adapted to be oscilllated relative to said lever, and a flexible member connecting said handle and reversing mechanism.

18. The combination of a motor, a bearing member rotatively supporting said motor, a transmission casing connected with said motor and provided with a rudder, clutch mechanism mounted in said transmission casing, a steering lever connected with said motor and provided with a handle pivotally connected thereto, a flexible rod connecting said handle and clutch mechanism, and a tubular passage supporting said flexible rod, said rod being moved endwise in the oscillatory movement of said handle.

19. The combination of a motor, a bearing sleeve rotatively supporting said motor at one end thereof, a transmission casing at the opposed end thereof, clutch mechanism mounted within said transmission casing, a steering lever rotatively mounted on said bearing sleeve and fixed to said motor, an oscillatory control lever pivotally connected to the end of said lever and rotative relative to said steering lever, a rotative clutch operating member, a flexible rod connecting said control lever and clutch operating member, and a tubular passage in said steering lever supporting said flexible rod, the same being moved endwise in the oscillatory movement of said control lever.

20. The combination of a motor, a bearing member supporting said motor, a transmission casing connected to said motor and provided with a vertical fin serving as a rudder, a steering lever operatively connected to said transmission casing, for rotating the same, said lever being provided with a handle pivotally connected thereto and adapted to be oscillated relative to said lever, clutch mechanism in said transmission casing, and a flexible rod operatively connecting said oscillatory handle and said clutch mechanism.

21. The combination of a motor, a bearing tube supporting said motor, a drive shaft in said tube, a transmission casing mounted at the free end of said tube, provided with a vertical fin serving as a rudder, a lever rotatively mounted on said bearing tube and connected to said motor and adapted to be swung laterally to effect the steering by means of said vertical fin, said lever being provided with a handle pivotally connected thereto and adapted to be oscillated relative to said lever, clutch mechanism in said transmission casing, a clutch operating member adjacent the pivoted end of said lever, and a flexible rod connecting said oscillatory handle and said clutch operating member.

22. The combination of a motor, a rudder, a propeller shaft in driving connection with said motor, a steering lever operatively connected with said rudder and provided with an oscillatory handle, reversing mechanism associated with said propeller shaft, a flexible rod connecting said oscillatory handle and reversing mechanism, and means for locking said handle in several predetermined positions relative to said lever.

23. The combination of a motor, a propeller shaft, a rudder, reversing mechanism associated with said propeller shaft, a steering lever for actuating said rudder, a handle pivotally mounted at the end of said steering lever and operatively connected to said reversing mechanism, a spring actuated dog mounted on said handle and adapted to engage a plurality of notches on said lever, said notches corresponding to the predetermined positions of the reversing mechanism, and manually operable means acting to release said dog from said notches.

24. The combination of a motor, a propeller shaft, a rudder, reversing mechanism associated with said propeller shaft, a steering lever for actuating said rudder, a handle pivotally mounted at the end of said steering lever, a flexible rod attached to the pivoted handle adjacent the pivotal point, said rod extending along said steering lever and within a tubular passage in said lever and operatively connected to said reversing mechanism, and means for locking said handle in a plurality of predetermined positions.

25. The combination of a motor, a propeller shaft, a rudder, reversing mechanism associated with said propeller shaft, a steering lever for actuating said rudder, a handle pivotally mounted at the end of said steering lever, a flexible rod connecting said handle and reversing mechanism, said lever being provided with a tubular passage through which said rod extends, a dog mounted on said handle and adapted to engage a plurality of notches on said lever and in the path of movement of said dog, and a plunger extending longitudinally of said handle and adapted to be moved endwise to release said dog from said notches, to permit the oscillation of said handle.

26. The combination with a motor, of a driving shaft, a driven shaft, a driving gear member on said driving shaft, a driven gear member rotatably mounted on said driven shaft and meshing with said driving gear member, a clutch member operable to connect said driven gear member to said driven shaft and embracing a circumferentially expansible and contractible member intermediate said driven shaft and gear member and adapted to frictionally connect the same.

27. The combination with a motor, of a driving shaft, a driven shaft, a driving gear member on said driving shaft, a driven gear member rotatably mounted on said driven shaft and meshing with said driving gear member, said driven gear member being provided with an annular friction surface, and a clutch member embracing a circumferentially expansible and contractible member intermediate said driven shaft and gear member and adapted to frictionally engage the friction surface of said gear member.

28. The combination with a motor, of a driving shaft, a driven shaft, intermeshing gear members on said driving and driven shafts, and a clutch member acting automatically to connect said driven gear member to said driven shaft and comprising a coil spring surrounding said driven shaft and connected at its ends to said driven gear member and said driven shaft, said coil spring being adapted to be expanded by the relative rotation of said driven gear member and clutch member to frictionally engage said driven gear member.

29. The combination with a motor, of a driving shaft, a driven shaft, intermeshing gear members on said driving and driven shafts, and a clutch member acting to connect said driven gear member to said driven shaft and comprising a coil spring connected at its ends to said driven gear member and driven shaft and adapted to be expanded circumferentially by the relative rotation of said driven gear member and clutch member to frictionally engage an annular friction surface of said driven gear member.

30. The combination of a motor, a driving shaft provided with a driving gear member, a driven shaft, a gear member meshing with said driving gear member and rotatably mounted on said driving shaft, said driven gear member being provided with a hub having an internal annular space, a sleeve loosely mounted on said driven shaft and extending into said space, and a coil spring mounted in said space and connected to said driven gear member and sleeve and adapted to frictionally engage the driven gear.

31. The combination of a motor, a driving shaft provided with a driving gear member, a driven shaft, a gear member meshing with said driving gear member and rotatably mounted on said driven shaft and provided with a hub having an internal annular space, a sleeve rotatively mounted on said driven shaft, means for connecting said sleeve to said driven shaft, and a coil spring connected at its ends to said driven gear member and sleeve and mounted within said annular space of the driven gear member, said spring being circumferentially expansible by the relative rotation of said driven gear member and sleeve, to frictionally engage the inner surface of the hub of said driven gear member.

32. The combination of a motor, a driving shaft provided with a driving gear member, a driven shaft, a driven gear member meshing with said driving gear member and rotatably mounted on said driving shaft, a manually operable clutch member mounted on said driven shaft and provided with an internal annular space in the hub thereof, a clutch sleeve loosely mounted on said driven shaft, a manually operable clutch member mounted on said driven shaft and shiftable into and out of engagement with said clutch sleeve, and a circumferentially expansible clutch member connecting said driven gear member and clutch sleeve, and acting automatically in the relative rotation thereof to frictionally engage said driven gear member.

33. The combination with a motor provided with a crank shaft having a longitudinal cavity in the end thereof, of a starting crank mounted in said cavity and adapted to be withdrawn therefrom and into cranking position.

34. The combination with a motor provided with a crank shaft having a longitudinal cavity in the end thereof, of a starting crank comprising a shank and a handle, said shank being insertible within said cavity and adapted to be withdrawn endwise therefrom into cranking position.

35. The combination with a motor provided with a crank shaft having a longitudinal cavity in the end thereof, of a starting crank insertible within said cavity and adapted to be withdrawn endwise therefrom into cranking position, and means for connecting said starting crank and crank shaft to permit the latter to be rotated in one direction.

36. The combination with a motor provided with a crank shaft having a longitudinal cavity in the end thereof, of a starting crank insertible within said cavity and adapted to be withdrawn endwise therefrom into cranking position, said crank shaft being provided with ratchet teeth adapted to be engaged by said crank.

37. The combination with a motor provided with a crank shaft having a central cavity in the end thereof, of a starting crank comprising a shank provided with a pivotally connected end portion, said shank being insertible within said cavity and adapted to be withdrawn endwise therefrom into cranking position at right angles to said crank shaft and pivoted end portion, and means for connecting said starting crank and crank shaft to permit the latter to be rotated in one direction.

38. The combination with a motor provided with a crank shaft having a longitudinal cavity in the end thereof, of a starting crank insertible within said cavity and comprising a shank, a handle at its outer end, and a pivoted end portion at the inner end of said shank, and a ratchet collar mounted at the end of said crank shaft and being provided with ratchet teeth, said crank being adapted to be withdrawn into cranking position at right angles to said crank shaft and into engagement with said ratchet teeth, said pivoted end portion engaging said collar and held within said cavity.

In testimony that I claim the foregoing as my invention I affix my signature in the presence of two witnesses, this 11th day of November, A. D. 1916.

EUGENE BIVERT.

Witnesses:
CHARLES H. POOLE,
EUGENE C. WANN.